United States Patent
Halfyard et al.

(10) Patent No.: US 8,557,368 B2
(45) Date of Patent: Oct. 15, 2013

(54) SUBSTRATE, SYSTEM AND METHOD FOR MAGNETIC INK CHARACTER RECOGNITION ENCODING

(75) Inventors: Kurt I. Halfyard, Mississauga (CA); T. Brian McAneney, Burlington (CA); Xan-Xing Hu, Oakville (CA); Edward Zwartz, Mississauga (CA); GuiQin Song, Milton (CA); Santokh Singh Badesha, Pittsford, NY (US); Gordon Sisler, St Catharines (CA)

(73) Assignee: Xerox Corporation, Norwalk, CT (US)

( * ) Notice: Subject to any disclaimer, the term of this patent is extended or adjusted under 35 U.S.C. 154(b) by 1745 days.

(21) Appl. No.: 11/982,473

(22) Filed: Nov. 2, 2007

(65) Prior Publication Data

US 2009/0117340 A1     May 7, 2009

(51) Int. Cl.
- B41J 31/00 (2006.01)
- B32B 38/00 (2006.01)
- B41M 5/00 (2006.01)
- G03G 7/00 (2006.01)
- B42D 15/00 (2006.01)

(52) U.S. Cl.
USPC ........ 428/195.1; 428/916; 156/277; 400/191; 283/57; 283/58; 283/59; 283/72; 283/83

(58) Field of Classification Search
USPC ............ 428/195.1, 916; 156/277; 283/57, 58, 283/59, 82, 83, 72; 400/191
See application file for complete search history.

(56) References Cited

U.S. PATENT DOCUMENTS

| | | | |
|---|---|---|---|
| 5,218,381 A | 6/1993 | Narang et al. | 346/140 R |
| 5,576,266 A * | 11/1996 | Flosenzier et al. | 503/227 |
| 5,729,813 A * | 3/1998 | Eddy et al. | 399/333 |
| 6,273,985 B1 | 8/2001 | DeLouise et al. | 156/273.3 |
| 6,485,130 B2 | 11/2002 | DeLouise et al. | 347/63 |
| 7,186,462 B2 | 3/2007 | Gervasi et al. | 428/447 |
| 2003/0112311 A1* | 6/2003 | Naik et al. | 347/105 |
| 2007/0054077 A1 | 3/2007 | Barrese et al. | 428/35.7 |

OTHER PUBLICATIONS

Article Re: Silane Coupling Agents: Connecting Across Boundaries, 12 pages, Gelest, Inc., Copyright 2006, www.cielest.com.

* cited by examiner

*Primary Examiner* — Mark Ruthkosky
*Assistant Examiner* — Laura C Dettinger
(74) *Attorney, Agent, or Firm* — Alix, Yale & Ristas, LLP (57) ABSTRACT

A document comprising a substrate with a surface having cellulose hydroxy groups, an adhesion promoter present on at least a first portion of the substrate surface, and a magnetic ink image formed over the first portion of the substrate surface. The adhesion promoter comprises a silane component including at least one amino functional group and at least one of a second type of functional group that is configured to bond with cellulose hydroxyl groups in the substrate. The magnetic ink image has a magnetic signal strength of at least 80%. A corresponding printing system and a method of printing also are disclosed.

20 Claims, 4 Drawing Sheets

SUBSTRATE, SYSTEM AND METHOD FOR MAGNETIC INK CHARACTER RECOGNITION ENCODING

BACKGROUND

The embodiments described herein generally relate to processing of pre-printed documents, and more particularly to a substrate configured to receive a magnetic ink image, and to a system and method for promoting adhesion of magnetic ink images to pre-printed documents.

As explained in U.S. Patent Publication 2005/0285918 (the disclosure of which is incorporated herein by reference in its entirety) inks suited for use in printing magnetic ink character recognition (MICR) readable documents are known. Such inks are generally employed in the printing and preparation of documents intended for automated processing, such as checks.

Of particular interest in this instance are those inks which contain a magnetic pigment or component in an amount sufficient to generate a magnetic signal that is strong enough to be MICR-readable. Such inks generally fall into the category of magnetic inks in general, and in the more specific subcategory of MICR-readable inks. Generally, the ink is used to print a portion of a document, such as a check, bond, security card, etc. containing an identification code area, which is intended for automated processing. The characters of this identification code are usually MICR encoded. The document may be printed with a combination of MICR-readable ink and non-MICR-readable ink, or with just MICR-readable ink. The document thus printed is then exposed to an appropriate source or field of magnetization, at which time the magnetic particles become aligned as they accept and retain a magnetic signal. The identification code on the document can then be recognized by passing it through a reader device that detects the magnetic signal of the MICR imprinted characters, or "reads" the signal, in order to recognize the coding printed on the document.

Of particular importance in the foregoing is the ability of the magnetic component of the ink to retain a sufficient charge such that the printed characters retain their readable characteristic and are easily detected by the detection device or reader. The magnetic charge retained by the pigment or magnetic component is known as "remanence".

In some situations, thermal ribbon printing mechanisms are used to generate MICR-readable characters or indicia. In this printing technique, the magnetic component is retained on a ribbon substrate by a binder and/or wax material. Then, upon application of heat and pressure, the magnetic ink is transferred to a substrate. Other details regarding thermal ribbon printing technology are discussed in detail in U.S. Patent Publication 2004/0137203, the entire contents of which are also incorporated herein by reference.

U.S. Pat. No. 5,888,622 discloses a coated cellulosic web product and a coating composition that provides enhanced toner adhesion for documents printed using noncontact printing devices such as ion deposition printers. U.S. Pat. No. 4,231,593 discloses a bank check with at least two coatings, one of which is electrically conductive, and the other which is electrically non-conductive. In some cases, a MICR ink is applied as an additional coating.

Silane compounds have been used in various ways in the printing industry. It is known from U.S. Pat. No. 4,029,827 to use polyorganosiloxanes having mercapto functionality as release agents. U.S. Pat. No. 5,157,445 discloses toner release oil having a functional organopolysiloxane. U.S. patent application Ser. No. 11/623,509 filed Jan. 16, 2007, entitled Adhesion Promoter, describes the incorporation of hydrolytic silane compounds into adhesives in order to promote adhesion to low surface energy surfaces. U.S. patent application Ser. No. 11/532,704 filed Sep. 18, 2006, entitled Adhesion Promoter, describes an adhesion promoter comprising a silane compound and a release agent and/or adhesive.

It would be useful to develop a system and method of preparing documents to receive and retain MICR encoded inks.

SUMMARY

One embodiment is a document comprising a substrate having a surface containing cellulose hydroxyl groups, an adhesion promoter present on at least a first portion of the substrate surface, and a magnetic ink image formed over the first portion of the substrate surface. The adhesion promoter comprises a silane component including at least one amino functional group and at least one of a second type of functional group that is configured to bond with cellulose hydroxyl groups in the substrate. The magnetic ink image has a magnetic signal strength of at least 80%.

Another embodiment is a printing system comprising a first printer configured to print a first set of data on a substrate, the first printer including a fuser employing fuser oil containing amino functional group release agents, an applicator configured to apply an adhesion promoter on at least a portion of the surface of the substrate, and a second printer downstream from the applicator configured to print magnetic ink character recognition data on at least part of the first portion of the substrate. The adhesion promoter comprises a silane component having at least one amino functional group and at least one of a second type of functional group that is configured to bond with cellulose hydroxyl groups in the substrate.

A further embodiment is a method comprising obtaining a substrate comprising cellulose hydroxyl groups, performing a printing process on a surface of the substrate to produce a pre-printed document, the printing process resulting in a residual coating of fuser oil on the surface of the pre-printed document, applying an adhesion promoter on at least a portion of the pre-printed document, and applying a magnetic image over the adhesion promoter using a magnetic ink character recognition encoding process. The adhesion promoter comprises a silane component including at least one amino functional group, and at least one of a second type of functional group that is configured to bond with cellulose hydroxyl groups in the substrate.

DETAILED DESCRIPTION

A substrate having a MICR image thereon, and a system and method for treating a portion of a document prior to application of a MICR ink, are described herein. The method involves the application of a silane coupler to improve the adhesion and/or magnetic signal strength of a MICR ink that is subsequently printed over the coupler. In embodiments, the MICR encoding produces documents with a reader rejection rate that is substantially lower than that resulting from MICR printing on untreated documents having fuser oil thereon.

The term "silane" as used herein refers to silanes that contain a hydroxyl group or a hydrolytic group. The term "silane component" as used herein includes silane oligomers, silane monomers, and mixtures of silane oligomers and monomers. As used herein, the term "magnetic ink image" refers to an image that is made using a magnetic ink or toner. The term "applicator" as used herein refers to a device suitable for applying a liquid coating to a substrate. "Magnetic signal strength" as used herein refers to the strength of a magnetic signal from a MICR ink deposited on a document. The term "substrate" refers to any media that may be printed on, such as paper including synthetic paper, pre-print forms, plastic films, transparencies, cardboard, cloth, etc. As used herein, a "document" is a substrate having an image printed thereon.

As used herein, a "pre-printed document" is a document that has primary MICR encoded or non-MICR encoded images printed thereon. The term "receive and retain a magnetic image" as used herein refers to the ability of the adhesion promoter to impart sufficient adhesion to a subsequently applied MICR image that the MICR image has a magnetic signal strength of at least 80%. The phrase "mitigate fuser oil" as used herein refers to a lessening of the negative impact that fuser oil has on adhesion and resulting magnetic signal strength of a MICR image. The term "printer" as used herein encompasses any apparatus, such as a digital copier, bookmaking machine, facsimile machine, multi-function machine, etc. that performs a print outputting function for any purpose.

On negotiable pre-printed documents such as checks and other negotiable instruments, the MICR amount field often is encoded as part of the bank's "proof of deposit" operation. One popular device for encoding MICR amounts uses thermal transfer ribbon print technology. Thermal ribbon readability in MICR reader/sorters can be degraded by prior application of some fuser oils (release agents) used when originally printing the check or pre-printed document. While mercapto-functional release agents have minimal impact on recognition rates, those containing amino-functional groups are found to degrade the image quality of this amount encoding technology. Embodiments herein present a methodology for eliminating the negative impact of release agents on encoders, including but not limited to magnetic thermal transfer ribbon (MTTR) and impact transfer ribbon MICR encoders, allowing development of MICR products on platforms that use amino-functional release agents.

Xerox DocuTech® and other machines can be used to print checks, and in embodiments, MICR encoding checks. The process allows for basic check writing abilities, but does not provide the flexibility to use color or allow for personalization of checks. In some machines, such as the DocuTech® family of machines, the background and initial MICR encoding, known as primary MICR encoding, is all performed on one machine. Fuser oils such mercapto, amino and other functional PDMS fuser oils, non-functional PDMS oils, and mixtures thereof, are used in such machines. The fuser oils are used to strip the sheets from the fuser members. Further, secondary MICR encoding is performed at the "bank of first deposit" where the MICR imprinting is placed over the fused check. When the completed check is placed through the check reader/sorter, the reject rate should be at or below 0.5%.

The materials and processes described herein alter the surface characteristic of substrates having fuser oil thereon. Generally stated, a silane coupler is deposited on the surface of portion of the document to be subsequently MICR encoded with a MICR ink. The coupler often is diluted in a solvent and the adhesion promoter usually is deposited using a light mechanical pressure. While not intending to be bound by theory, it is believed that the solvent carries a portion of the surface oil into the sheet, while the coupler stays on the surface and enhances adhesion of MICR inks subsequently applied by a ribbon transfer method. As a result, the MICR encoded images have good readability. The alkoxy groups in the oligomers have the potential to hydrogen bond to cellulose hydroxyl groups in the substrate.

The resulting magnetic signal strength of an encoded image applied over the adhesion promoter is at least 80%, and sometimes is 90%. Magnetic signal strength of a magnetic image can be measured by using known devices, including the MICR-Mate 1, manufactured by Checkmate Electronics, Inc.

In one embodiment, the method is used to treat a portion of a document prior to secondary MICR encoding using a MICR ink applied by a ribbon transfer process. In many cases, the document has first been processed with a xerographic printer, and in particular, a high-speed xerographic printer, using a first MICR toner for primary MICR encoding, followed by a high-speed xerographic printing machine using non-MICR toner. In embodiments, the MICR toner used for primary encoding is usually black and the non-MICR xerographic toner can be black or color, and in embodiments is color. The xerographic MICR printer and non-MICR xerographic print engine may be separate machines, which are either loosely or tightly coupled. The document often, but not necessarily, is then sent to a different location for the secondary encoding process.

MICR Toner Compositions

The MICR toner compositions selected herein for use in primary MICR encoding may comprise resin particles, magnetites, and optional colorant, such as pigment, dyes, carbon blacks, and waxes such as polyethylene and polypropylene. The toners can further include a second resin, a colorant or colorants, a charge additive, a flow additive, reuse or recycled toner fines, and other ingredients. A carrier optionally can be included. Also there can be blended at least one surface additive with the ground and classified melt mixed toner product. Toner particles in embodiments can have a volume average diameter particle size of about 6 to about 25, or from about 6 to about 14 microns.

Resin

Illustrative examples of resins suitable for MICR toner and MICR developer compositions herein include linear or branched styrene acrylates, styrene methacrylates, styrene butadienes, vinyl resins, including linear or branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. A specific example includes styrene butadiene copolymers, mixtures thereof, and the like, and also styrene/n-butyl acrylate copolymers, PLIOLITES®; suspension polymerized styrene butadienes, reference U.S. Pat. No. 4,558,108, the disclosure of which is totally incorporated herein by reference.

Magnetite

Various forms of iron oxide can be used as the magnetite. Magnetites can include a mixture of iron oxides (for example, $FeO.Fe_2O_3$) and carbon black, including those commercially available as MAPICO BLACK®. Mixtures of magnetites can be present in the toner composition in an amount of from about 10 to about 70 percent by weight, or from about 10 percent by weight to about 50 percent by weight. Mixtures of carbon black and magnetite with from about 1 to about 15 weight percent of carbon black, or from about 2 to about 6 weight percent of carbon black, and magnetite, in an amount of, for example, from about 5 to about 60, or from about 10 to about 50 weight percent, can be selected.

Wax

Illustrative examples of aliphatic hydrocarbon waxes include low molecular weight polyethylene and polypropylene waxes with a weight average molecular weight of, for example, about 500 to about 5,000. Also, there are included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes used for the toner compositions are believed to have a molecular weight of from about 4,000 to about 5,000. The wax can be present in the toner in an amount of from about 4 to about 7 weight percent.

Optional Carrier

Illustrative examples of carrier particles include iron powder, steel, nickel, iron, ferrites, including copper zinc ferrites, and the like. The carrier can be coated with a costing such as terpolymers of styrene, methylmethacrylate, and a silane, such as triethoxy silane, including for example KYNAR® and polymethylmethacrylate mixtures (40/60). Coating weights can vary as indicated herein. However, the weights can be from about 0.3 to about 2, or from about 0.5 to about 1.5 weight percent coating weight.

The printing process can be employed with either or both single component (SCD) and two-component development systems. Toners useful in MICR printing include mono-component and dual-component toners. Toners for MICR include those having a binder and at least one magnetic material. Optionally, the toner may include a surface treatment such as a charge control agent, or flowability improving agents, a release agent such as a wax, colorants and other additives.

Non-MICR Toners

Suitable non-MICR toners for use for printed images on a document that also contains MICR encoding are disclosed in, for example, U.S. Pat. Nos. 6,326,119; 6,365,316; 6,824,942 and 6,850,725, the disclosures thereof are hereby incorporated by reference in their entirety. In embodiments, the non-MICR toner can be black or color, and in embodiments, is color non-MICR xerographic toner.

The non-MICR toner resin can be a partially crosslinked unsaturated resin such as unsaturated polyester prepared by crosslinking a linear unsaturated resin (hereinafter called base resin), such as linear unsaturated polyester resin, in embodiments, with a chemical initiator, in a melt mixing device such as, for example, an extruder at high temperature (e.g., above the melting temperature of the resin, and more specifically, up to about 150° C. above that melting temperature) and under high shear. Also, the toner resin possesses, for example, a weight fraction of the microgel (gel content) in the resin mixture of from about 0.001 to about 50 weight percent, from about 1 to about 20 weight percent, or about 1 to about 10 weight percent, or from about 2 to about 9 weight percent. The linear portion is comprised of base resin, more specifically unsaturated polyester, in the range of from about 50 to about 99.999 percent by weight of the toner resin, or from about 80 to about 98 percent by weight of the toner resin. The linear portion of the resin may comprise low molecular weight reactive base resin that did not crosslink during the crosslinking reaction, more specifically unsaturated polyester resin.

The molecular weight distribution of the resin is thus bimodal having different ranges for the linear and the crosslinked portions of the binder. The number average molecular weight ($M_n$) of the linear portion as measured by gel permeation chromatography (GPC) is from, for example, about 1,000 to about 20,000, or from about 3,000 to about 8,000. The weight average molecular weight ($M_w$) of the linear portion is from, for example, about 2,000 to about 40,000, or from about 5,000 to about 20,000. The weight average molecular weight of the gel portions is greater than 1,000,000. The molecular weight distribution ($M_w/M_n$) of the linear portion is from about 1.5 to about 6, or from about 1.8 to about 4. The onset glass transition temperature (Tg) of the linear portion as measured by differential scanning calorimetry (DSC) is from about 50° C. to about 70° C.

Moreover, the binder resin, especially the crosslinked polyesters, can provide a low melt toner with a minimum fix temperature of from about 100° C. to about 200° C., or from about 100° C. to about 160° C., or from about 110° C. to about 140° C.; provide the low melt toner with a wide fusing latitude to minimize or prevent offset of the toner onto the fuser roll; and maintain high toner pulverization efficiencies. The toner resins and thus toners, show minimized or substantially no vinyl or document offset.

Examples of unsaturated polyester base resins are prepared from diacids and/or anhydrides such as, for example, maleic anhydride, fumaric acid, and the like, and mixtures thereof, and diols such as, for example, propoxylated bisphenol A, propylene glycol, and the like, and mixtures thereof. An example of a suitable polyester is poly(propoxylated bisphenol A fumarate).

In embodiments, the toner binder resin is generated by the melt extrusion of (a) linear propoxylated bisphenol A fumarate resin, and (b) crosslinked by reactive extrusion of the linear resin with the resulting extrudate comprising a resin with an overall gel content of from about 2 to about 9 weight percent. Linear propoxylated bisphenol A fumarate resin is available under the trade name SPAR II™ from Resana S/A Industrias Quimicas, Sao Paulo Brazil, or as NEOXYL P2294™ or P2297™ from DSM Polymer, Geleen, The Netherlands, for example. For suitable toner storage and prevention of vinyl and document offset, the polyester resin blend more specifically has a Tg range of from, for example, about 52° C. to about 64° C.

Chemical initiators, such as, for example, organic peroxides or azo-compounds, can be used for the preparation of the crosslinked toner resins. The low melt toners and toner resins may be prepared by a reactive melt mixing process wherein reactive resins are partially crosslinked. For example, low melt toner resins may be fabricated by a reactive melt mixing process comprising (1) melting reactive base resin, thereby forming a polymer melt, in a melt mixing device; (2) initiating crosslinking of the polymer melt, more specifically with a chemical crosslinking initiator and increased reaction temperature; (3) retaining the polymer melt in the melt mixing device for a sufficient residence time that partial crosslinking of the base resin may be achieved; (4) providing sufficiently high shear during the crosslinking reaction to keep the gel particles formed and broken down during shearing and mixing, and well distributed in the polymer melt; (5) optionally devolatilizing the polymer melt to remove any effluent volatiles; and (6) optionally adding additional linear base resin after the crosslinking in order to achieve the desired level of gel content in the end resin. The high temperature reactive melt mixing process allows for very fast crosslinking which enables the production of substantially only microgel particles, and the high shear of the process prevents undue growth of the microgels and enables the microgel particles to be uniformly distributed in the resin.

A reactive melt mixing process is, for example, a process wherein chemical reactions can be affected on the polymer in the melt phase in a melt-mixing device, such as an extruder. In preparing the toner resins, these reactions are used to modify the chemical structure and the molecular weight, and thus the melt rheology and fusing properties of the polymer. Reactive melt mixing is particularly efficient for highly viscous materials, and is advantageous because it requires no solvents, and thus is easily environmentally controlled. As the amount of crosslinking desired is achieved, the reaction products can be quickly removed from the reaction chamber.

The resin is present in the non-MICR toner in an amount of from about 40 to about 98 percent by weight, or from about 70 to about 98 percent by weight. The resin can be melt blended or mixed with a colorant, charge carrier additives, surfactants, emulsifiers, pigment dispersants, flow additives, embrittling agents, and the like. The resultant product can then be pulverized by known methods, such as milling, to form the desired toner particles.

Waxes with, for example, a low molecular weight $M_w$ of from about 1,000 to about 10,000, such as polyethylene, polypropylene, and paraffin waxes, can be included in, or on the non-MICR toner compositions as, for example, fusing release agents. It is noted that the adhesion promoter would not typically be applied over the non-MICR toners because it is applied to areas of the check that are to contain encoded data.

Various suitable colorants of any color can be present in the non-MICR toners, including suitable colored pigments, dyes, and mixtures thereof including REGAL 330®; (Cabot), Acetylene Black, Lamp Black, Aniline Black; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like; cyan, magenta, yellow, red, green, brown, blue or mixtures thereof, such as specific phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments and dyes that can be selected are cyan, magenta, or yellow pigments or dyes, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Other colorants are magenta colorants of (Pigment Red) PR81:2, CI 45160:3. Illustrative examples of cyans that may be selected include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Forum Yellow SE/GLN, CI Dispersed Yellow 33 2,5-dimethoxy-4-sulfonanilide phenylazo-4'-chloro-2,5-dimethoxy acetoacetanilides, and Permanent Yellow FGL, PY17, CI 21105, and known suitable dyes, such as red, blue, green, Pigment Blue 15:3 C.I. 74160, Pigment Red 81:3 C.I. 45160:3, and Pigment Yellow 17 C.I. 21105, and the like, reference for example U.S. Pat. No. 5,556,727, the disclosure of which is totally incorporated herein by reference.

The colorant, more specifically black, cyan, magenta and/or yellow colorant, is incorporated in an amount sufficient to impart the desired color to the toner. In general, pigment or dye is selected, for example, in an amount of from about 2 to about 60 percent by weight, or from about 2 to about 9 percent by weight for color toner, and about 3 to about 60 percent by weight for black toner.

The non-MICR toner composition can be prepared by a number of known methods including melt blending the toner resin particles, and pigment particles or colorants, followed by mechanical attrition. Other methods include those well known in the art such as spray drying, melt dispersion, dispersion polymerization, suspension polymerization, extrusion, and emulsion/aggregation processes.

The resulting non-MICR toner particles can then be formulated into a developer composition. The toner particles can be mixed with carrier particles to achieve a two-component developer composition.

Silane Adhesion Promoter

The adhesion promoter contains a silane component and optionally includes a solvent. A buffer agent optionally also can be included to increase the degree of oligomerization of the silane couplers by enabling further hydrolysis of the, e.g., methoxy and/or ethoxy groups of the silane via phosphate and bisulfite buffer solutions. An increase in oligomerization may yield larger coupler molecules that can potentially stay on the surface. In embodiments, the silane component is selectively applied to the portion of the document that is to receive secondary MICR encoding. The silane component is usually applied after the initial printing step (primary MICR and/or non-MICR) and fusing step, but before any secondary MICR encoding has taken place. When the adhesion promoter is applied to the surface of a document according to the processes described herein, the magnetic signal strength of the resulting MICR encoded image is better than that of a document having fuser oil thereon but no adhesion promoter.

In embodiments, the adhesion promoter can be applied at a suitable time after fusing with fuser oil and before any secondary MICR encoding. The adhesion promoter can be applied as part of the pre-print production line, at a location at which secondary MICR encoding takes place, and/or at a location intermediate these two locations.

After the adhesion promoter is applied, it is dried. Drying can be accomplished by use of ambient air with or without the addition of minimal heat, for example, heating to from about 20 to about 90° C., or from about 25 to about 45° C., or from about 30 to about 38° C.

The silane component provides at least two beneficial functions in order to promote adhesion of a subsequently applied MICR ink to the substrate. First, the silane component contains at least one hydrolytic group —Si(R)$_{3-m}$X$_m$, wherein R is hydrocarbyl group having from one to about 6 carbon atoms, X is a hydroxyl group or a hydrolytic group, and m is an integer from 1 to 3. Illustrative examples of hydrolytic group X are a halide, a carboxyl group, an alkoxyl group, an arylalkyloxyl group, an aryloxyl group and the like. Preferably, the hydrolytic group is an alkoxyl group having from 1 to about 6 carbon atoms. The silane component typically has 2-6 functional groups of this type.

Second, the silane compound contains an amino group which can facilitate the silane bonding chemistry and increase the surface energy of the silane component. The silane component typically has 1-2 amino functional groups.

One type of suitable silane compound is

Formula A wherein A1 and A2 are the same or different and represent —R1-X, R1 represents an alkyl group having from 1 to about 6 carbons, or from about 1 to about 4 carbons, X represents —NH2 or —NHR2NH2 wherein R2 represents an alkyl group having from 1 to 6 carbons, or from 1 to 3 carbons, R$_3$, R$_4$, R$_5$ and R$_6$ are the same or different and represent groups having from 1 to 6 carbons, or 1 to 3 carbons, R$_7$ and R$_8$ are the same or different and represent alkyl groups having from 1 to 6 carbons, or 1 to 3 carbons, and n is 1 to 100.

One non-limiting example of a silane component of the type described above is:

Formula B

Various non-limiting examples of suitable silane components include the following monomers, as well as oligomers prepared from the following monomers:
4-aminobutyltriethoxysilane, 1-amino-2-(dimethylethoxysilyl)propane, N-(2-aminoethyl)-3-aminoisobutyldimethylmethoxysilane, N-(2-aminoethyl)-3-aminoisobutyldimethylmethoxysilane, (aminoethylaminomethyl) phenethyltrimethoxysilane, N-(2-aminoethyl)-3-aminopropylmethyldimethoxysilane, N-(2-aminoethyl)-3-aminopropylsilanetriol, N-(2-aminoethyl)-3-aminopropyltriethoxysilane, N-(2-aminoethyl)-3-aminopropyltrimethoxysilane, N-aminoethyl-AZA-2,2,4-trimethylsilacyclopentane, N-(6-aminohexyl)aminomethyl-trimethoxysilane, N-(6-aminohexyl)aminopropyltrimethoxysilane, N-(2-aminoethyl)-11-aminoundecyltrimethoxysilane, 3-aminopropylmethylbis(trimethylsiloxy)silane, 3-aminopropyldimethylethoxysilane, 3-aminopropyltrimethoxysilane, 3-aminopropyltris(methoxyethoxyethoxy)silane, 3-(triethoxysilyl)propylsuccinic anhydride, tris(3-trimethoxysilylpropyl)iso-cyanurate, (3-trimethoxysilylpropyl)diethylene-triamine, methyltrichlorosilane, dimethyldichlorosilane, methyltriethoxysilane, ethyltrichlorosilane, ethyltrimethoxysilane, dimethyldimethoxysilane, methyltriethoxysilane, ethyltriethoxysilane, propyltrimethoxysilane, amino silane hydrochloride, 3-glycidoxypropyl trimethoxysilane (Z-6040, available from Dow Corning; KBM 403, available from Shin-Etsu), methyltrimethoxysilane (Z-6070, available from Dow Corning; KBM 13, available from Shin-Etsu), methacryloxypropyltrimethoxysilane (Z-6030, available from Dow Corning; KBM502, available from Shin-Etsu), aminopropyltrimethoxysilane (Z-6011, available from Dow Corning; KBM903, available from Shin-Etsu), aminoethylaminopropyltrimethoxysilane (KBM603, available from Shin-Etsu or DOW Z 6032, available from Dow Corning; KBM603, available from Shin-Etsu), trifluoropropyltrimethoxysilane (KBM7103, available from Shin-Etsu), heptadecafluorodecyltrimethoxysilane (KBM7803, available from Shin-Etsu), isocyanatopropyltriethoxysilane (KBE9007, available from Shin-Etsu), aminopropyltriethoxysilane (KBE903, available from Shin-Etsu), aminoethylaminopropyltriethoxysilane (KBE603, available from Shin-Etsu), alkyltrimethoxysilane (DOW HV 10, available from Dow Corning), and a material having trifluoropropy trimethoxysilane, vinylmethoxysilane, tetra(2-methoxyethoxy)silane (DOW 4040 Prime Coat, available from Dow Corning), mixtures thereof, and the like.

The silane component can be directly applied without solvent, or can be diluted in a solvent for convenience. When a solvent is included, the silane components typically are used in concentrations of 1 to 95 wt % based on the total silane component and solvent, or 1 to 50 wt % or 1 to 10 wt %. Non-limiting examples of suitable solvents include small chain silicone solvents comprising at least one member selected from the group consisting of linear siloxanes having 2 to 10 silicon atoms and cyclic siloxanes having 3 to 6 silicon atoms. Specific non-limiting examples of suitable solvents are octamethylcyclotetrasiloxane and hexamethyldisiloxane (HMDS).

As indicated above, in some cases, the silane compound and solvent are mixed with an aqueous buffer solution in order to maintain the chemical stability of the mixture. The buffer solution typically is made by dissolving buffer agent into distilled water. The buffer agent may be an inorganic salt, for example an alkali metal phosphate, an alkali metal sulfite and the like, or an aqueous solution of an inorganic salt. Other suitable buffer agents include aqueous solutions of potassium phosphate monobasic, potassium phosphate dibasic, sodium hydrogen sulfite, mixtures thereof, and the like.

In embodiments, the aqueous buffer solution may be prepared to form from about 1% by weight to saturated buffer solution, such as, from about 5% to about 25% by weight buffer solution, and for example from about 5% to about 15% by weight buffer solution.

In embodiments, the aqueous buffer solution may be added to the silane component, for example in a silane to buffer solution ratio from 1:0.01 to 1:0.5, such as a ratio of 1:0.15 and for example a ratio of 1:0.35. The buffer solution may be added to the silane component while keeping the silane component agitated at room temperature.

The applicator usually is a mechanical applicator having a roller, sponge, cloth, air atomized, hydraulic or ultrasonic spray. The applicator can be any type of device that applies a thin, uniform, liquid coating to particular portions of a substrate using light mechanical pressure. The adhesion promoter can be applied to selected portions of the document by any suitable application method. Non-limiting examples of application methods include use of a sponge or use of an indexing web that constantly provides new, clean material. The dried thickness of the adhesion promoter typically is 0.1 micron to 50 microns, or 0.5 to 50 microns. The treated substrate can be dried using known methods including air drying, infrared drying, and the like. The silane provides sufficient wetting to allow for a uniform application over oil covered, fused toner documents.

After the adhesion promoter is placed on the document and dried, secondary MICR imprinting may take place. Any suitable encoder can be used to supply the MICR encoding. As a non-limiting example, an NCR 7766-100 encoder, available from NCR Corporation, can be used. This device employs a magnetic thermal transfer ribbon, which places the ink from the ribbon onto the treated and dried substrate. An encoder using an impact transfer ribbon also can be used.

MICR Ink Compositions for Transfer Ribbon Printing

The MICR ink compositions selected herein for use in secondary MICR encoding using a transfer ribbon process typically comprise a dried film supported on a ribbon. The film includes magnetic material, which usually is a particulate material, a binder, a colorant (if needed in additional to the magnetic material), and other optional additives, including a release agent, such as an oil or wax component. Non-limiting examples of waxes include carnauba wax and low molecular weight polyethylene. The magnetic material can be an organic molecule-based magnetite and/or an inorganic magnetite. The binder is usually one or more thermoplastic resins used in coating formulations. Multiple resins can be combined to provide the desired property profiles. The colorant typically is pigments, dyes and/or carbon black. The ribbon typically has a thickness of about 5 microns, the binder layer has a thickness of about 25 microns and the ink/wax layer has a thickness of about 5 microns. Solvents are often used in preparing the ink-containing ribbon. Additional description of certain MICR inks that can be applied using a thermal transfer ribbon can be found in U.S. Pat. No. 5,866,637 assigned to NCR Corp., the contents of which are incorporated by reference herein in their entirety.

As indicated above, the silane component enables adhesion of the magnetic ink from the magnetic thermal transfer ribbon, and therefore leaves a surface on which further MICR encoding can be carried out with a rejection rate which is greatly improved over oil-coated prints that do not include the adhesion promoter. Typically, when the document is a check, a narrow area of the check is treated, e.g. a 0.5-5 cm wide portion across the long edge of the check (the MICR encoding line). In embodiments, the system can be incorporated in-line with a non-MICR printer after the fusing step. This technique facilitates the mitigation of oil which contaminates the surface of the substrate after the fusing step.

Paper cockle is a condition in which bumps or ridges are formed on a printed sheet of paper, resulting in a wavy appearance. Treating only a small area along the document MICR line minimizes paper cockle, which otherwise might if the entire document surface were covered. With curl, the edges of the paper move towards the center of the paper, sometimes forming a curled tube. To measure curl, one measures the height of each corner of a sheet of paper that is lying on a flat surface. The presence of cockle often reduces the degree of curl. The disclosed embodiments enable adhesion promoters to be applied without resulting in problems of cockle or curl.

Figure 1:
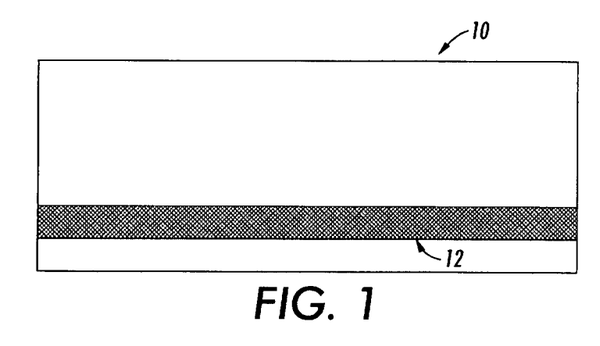
FIG. 1 schematically shows a treated substrate according to one embodiment.

Referring first to FIG. 1, a substrate is shown and is designated as 10. The substrate 10 has an adhesion promoting coating 12 in the form of a strip over the encoding area of the substrate 10. The coating 12 comprises a silane component having amino and alkoxyl functional groups.

Figure 2:
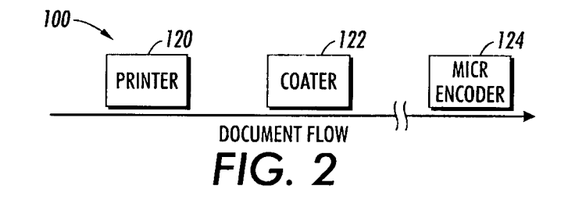
FIG. 2 is a schematic drawing of a system used with embodiments herein.

Referring now to FIG. 2, a system and corresponding method for encoding data on pre-printed forms is designated as 100. A pre-printed document moves as shown by the document flow arrow of FIG. 2. A printer 120 pre-prints a document in a process that employs fuser oil, and a coater 122 applies an adhesion promoter comprising a silane component having amino and alkoxy functional groups to at least the area of the document to be subsequently encoded. Then, a MICR encoder 124, often at a different location than the coater 122, adds the secondary MICR encoded data to the document. In some cases, the document is subjected to a finishing process, such binding, after application of the adhesion promoter and before MICR encoding.

Figure 3:
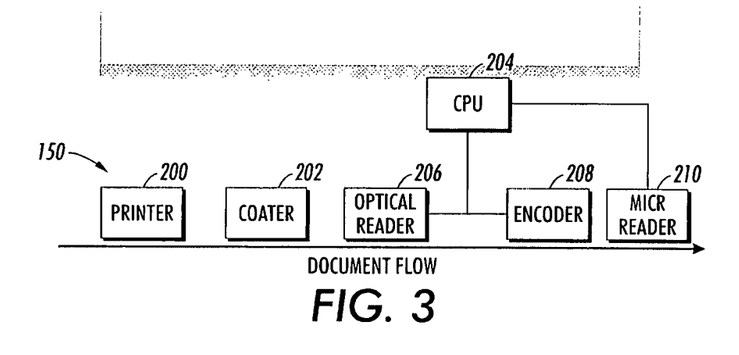
FIG. 3 is a schematic drawing of another system used with embodiments herein.

Another system and corresponding method for printing, coating, scanning, and encoding is shown in FIG. 3 and is designated as 150. More specifically, FIG. 3 illustrates a printer 200, a coater 202, an optical reader 206, a central processing unit (CPU) 204, an encoder 208, and an optional second (MICR) reader 210. The readers 206, 210, CPU 204, and encoder 208 are standard commercially available items and are well-known to those ordinarily skilled in the art. Therefore, a detailed discussion of the same is omitted herefrom.

A pre-printed document moves as shown by the document flow arrow of FIG. 3, and after pre-printing by the printer 200 the portion of the document to be encoded is treated with an adhesion promoter using the coater 202. The data to be read and subsequently encoded is added to the document at any time during or after it is pre-printed, but before it is encoded by the encoder 208. Data to be encoded is then read by the optical reader 206. In the optical reader 206, a device reads (e.g., scans) data that was previously recorded in the pre-printed document and processes the scanned data in, for example, an optical character recognition (OCR) process (see U.S. Pat. No. 6,782,144, the complete disclosure of which is incorporated herein by reference, for a description of OCR and scanning systems). The read data is encoded at 208. The optional second reader 210 can be used to verify the encoding process.

The central processing unit 204 performs the necessary processing, such as optical character recognition (OCR), and instructs the encoder 208 to encode the MICR data on the document as the document passes by the encoder 208. For example, the method can read data that was hand written or machine printed by the user in a blank preprinted form. For example, the method can read monetary amounts hand written or printed in blanks of pre-printed documents.

In the systems and methods shown in FIGS. 2 and 3, the adhesion promoter comprising a silane component having amino and hydrolytic functional groups provides the subsequently MICR encoded image with sufficient adhesion and magnetic signal strength that the MICR image can be accurately read electronically. Thus, the disclosed method can record the processed data on the treated portion of the document using a MICR encoder in item 208 without encountering problems with fuser oils such that those containing amino-functional group release agents.

The following Examples are intended to illustrate and not limit the scope herein.

Example 1

Xerox check stock 4024 DP, 24# (green perforated letter check) was run through an iGen3 (Xerox Corp.) fusing subsystem to coat the paper stock with a representative amount of oil, about 10 (ranging from 8-13) microlitres of oil per copy. A portion of the check stock along the MICR encoding line having a length of about 22 cm and a width of about 2 cm was then coated with an adhesion promoter having the composition of Formulation 1 shown below. This portion extended horizontally from the left side of the check and was about 0.25 cm from the bottom of the check. The adhesion promoter was applied using a saturated paper tissue.

Formulation 1:1 wt. % aminosiloxane oligomer (VX-225, GE Silicones, Wilton, Conn.) 99 wt % octamethylcyclotetrasiloxane solvent (Sigma-Aldrich, St. Louis, Mo.)

After application and drying, the secondary encoding took place. This was done using a NCR 7766-100 encoder (NCR Corp.) with a magnetic thermal transfer ribbon (MTTR) which placed the ink (secondary encoding) on the dried wax emulsion. After secondary encoding, testing of the completely finished check was conducted by measuring the magnetic signal strength of the secondary encoding by running the check through a MICR Qualifier GTX (RDM Corp.).

Generally speaking, a check which does not contain any oil (mercapto or otherwise) will produce a magnetic signal strength of approximately 98%±2%. However, when covered with 0.09% amino functionalized fuser oil such as an iGen3 fuser oil, the magnetic signal strength decreases to below 80%. A magnetic signal strength of greater than or equal to 80% or more would lead to a reader reject rate for the document of no more than about 0.5%.

Figure 4:
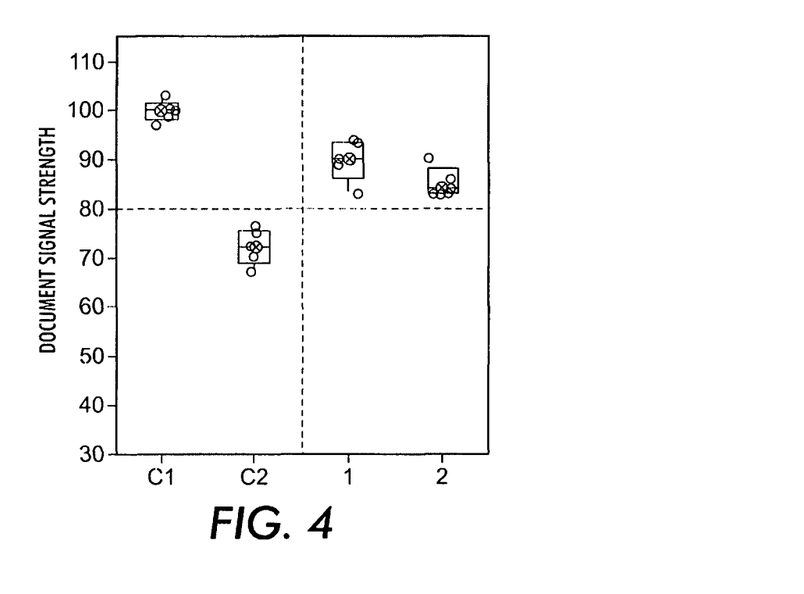
FIG. 4 shows box plots of magnetic signal strengths, demonstrating the relative signal strengths of a first type of MICR encoded check stock with and without fuser oil present, and with and without a first type of silane component applied to the encoded portion of the check.

The magnetic signal strength results for this example are shown in FIG. 4 and are labeled as "1." As is shown in FIG. 4, use of the silane of Formulation 1 resulted in a magnetic signal strength of about 82-93% when applied to a document having fuser oil thereon.

Example 2

The procedure of Example 1 was repeated with the exception that the adhesion promoter that was used had formulation 2 shown below:

Formulation 2: 10 wt. % aminosiloxane oligomer (VX-225, GE Silicones, Wilton, Conn.) 90 wt % hexamethyldisiloxane (HMDS) (Sigma-Aldrich, St. Louis, Mo.)

The results are shown on FIG. 4 and are labeled as "2." As is shown in FIG. 4, use of the adhesion promoter of Formulation 1 resulted in a magnetic signal strength of 82-90% when applied to a document having fuser oil thereon.

Comparative Examples 1 and 2

The same check stock as was used in Example 1 was not treated with fuser oil or an adhesion promoter in one case (Comparative Example 1, shown as C1). In another case the check was printed and fused using fuser oil and no adhesion promoter was applied (Comparative Example 2, shown as C2). The same MICR encoding process was used as in Example 1 and magnetic signal strengths were measured. The magnetic signal strength results are shown on FIG. 4. The check stock that had not been fused had a magnetic signal strength of about 100%. The check stock with fuser oil thereon had a magnetic signal strength of about 72%.

Example 3

The procedure of Example 1 was repeated with the exception that the check stock used was 12-up personal check stock. The results are shown on FIG. 5 and are labeled as "3."

Figure 5:
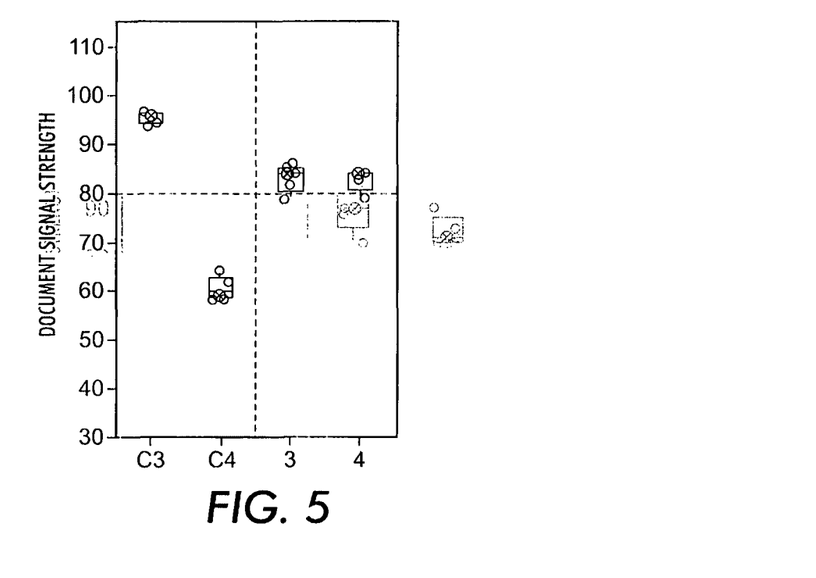
FIG. 5 shows box plots of magnetic signal strength for MICR images on a second type of treated and untreated check stock.

As is shown in FIG. 5, use of the adhesion promoter of Formulation 1 resulted in a magnetic signal strength of about 83% when applied to a document having fuser oil thereon.

Example 4

The procedure of Example 2 was repeated with the exception that the check stock was 12-up personal check stock. The results are shown on FIG. 5 and are labeled as "4."

As is shown in FIG. 5, use of the adhesion promoter of Formulation 2 resulted in an average magnetic signal strength of about 82% when applied to a document having fuser oil thereon.

Comparative Examples 3 and 4

The same check stock as was used in Example 3 was not treated with fuser oil in one case and not treated with the silane (Comparative Example 3, shown as C3). In another case the check was printed and fused and no silane was applied (Comparative Example 4, shown as C4). The same MICR encoding process was used as in Example 3. The results are shown on FIG. 5. The un-oiled check had a magnetic signal strength of about 95%. The oiled check had a magnetic signal strength of about 60%.

Examples 5a-5d

Figure 6:
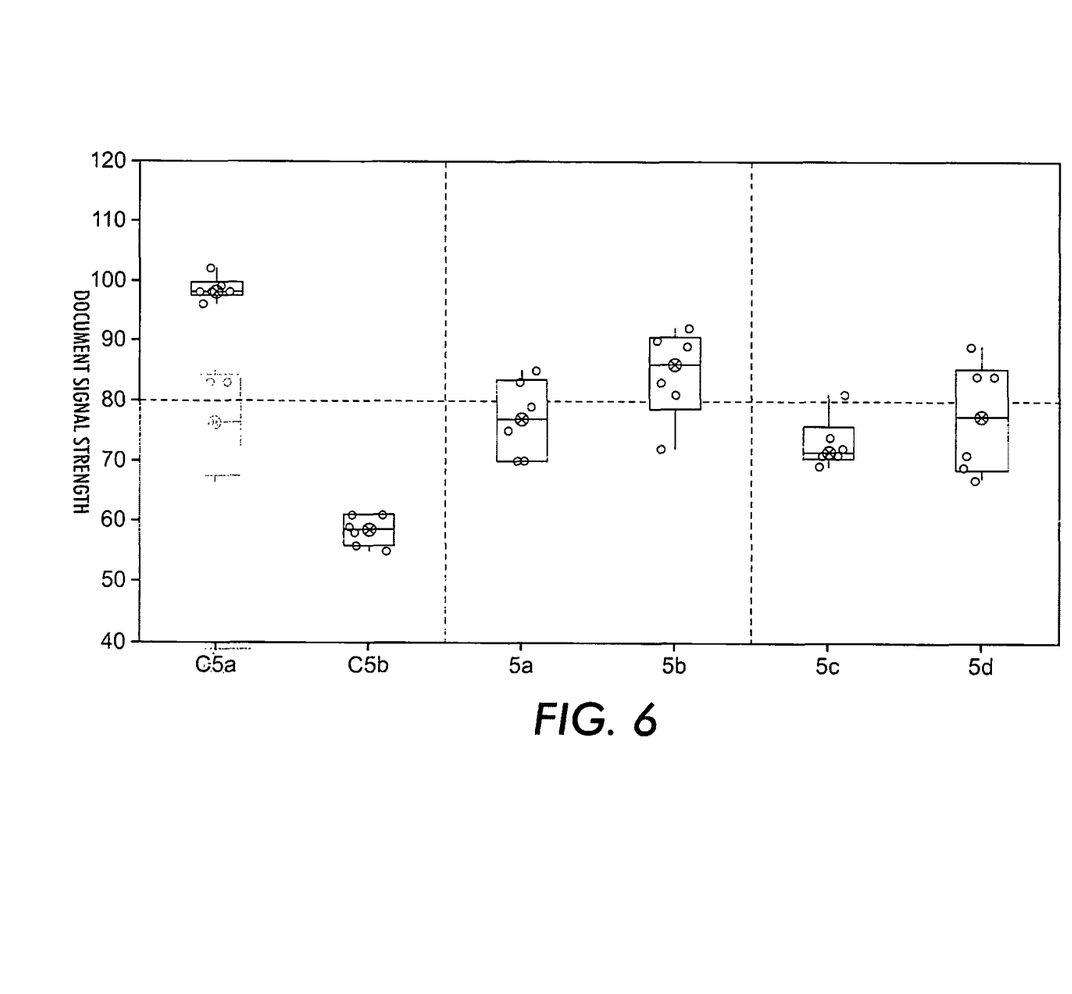
FIG. 6 shows box plots of magnetic sign strengths for MICR images for a substrate treated with silane components of various formulations.

The procedure of Example 3 was repeated with the exception that the silanes used were a silane oligomer functionalized with amino groups and 6 methoxy groups, $(CH_3O)_3Si—(CH_2)_3—NH—(CH_2)_3—Si(OCH_3)_3$) (Gelest SIB1833.0, Gelest, Inc. Morrisville, Pa.), in amounts of 1 wt % in 5a and 10 wt % in 5b, and a silane oligomer functionalized with amino groups and 6 ethoxy groups $—(C_2H_5O)_3Si—(CH_2)_3—NH—(CH_2)_3—Si(OC_2H_5)_3$ (Gelest SIB1824.6, Gelest, Inc. Morrisville, Pa.), in amounts of 1 wt. % in 5c and 10 wt % in 5d. The remaining wt % was octamethylcyclotetrasiloxane (Sigma-Aldrich, St. Louis, Mo.) solvent. The results are shown on FIG. 6. As indicated on FIG. 6, an improvement in magnetic signal strength was obtained when the adhesion promoter was used.

Comparative Examples 5a and 5b

The same check stock as was used in Examples 5a-5d was not treated with fuser oil in one case and not treated with the silane (Comparative Example 5a, shown as C5a). In another case the check was printed and fused and no adhesion promoter was applied (Comparative Example 5b, shown as C5b). The same MICR encoding process was used as in Examples 5a-5d. The results are shown on FIG. 6. The un-oiled check had a magnetic signal strength of about 98%. The oiled check had a magnetic signal strength of about 60%.

Examples 6a-6c

Figure 7:
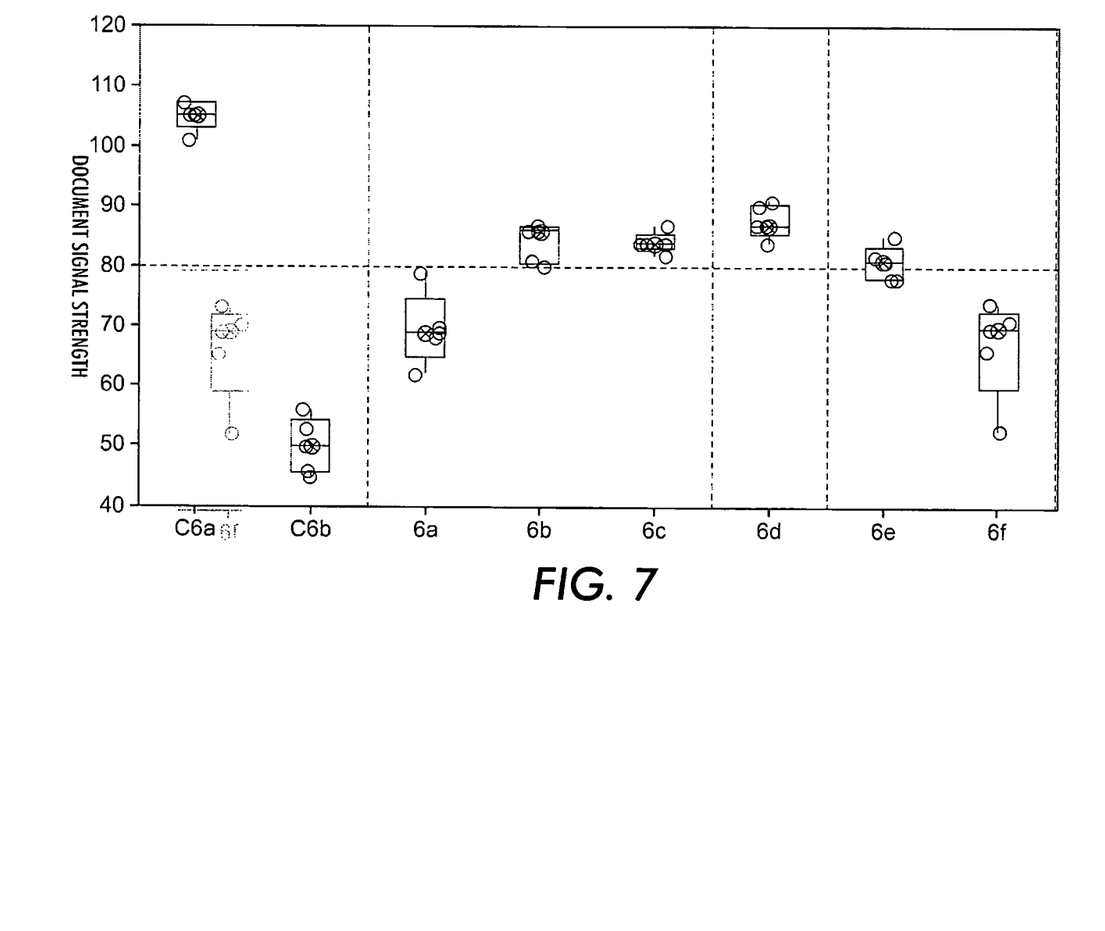
FIG. 7 shows box plots of magnetic signal strengths for MICR images applied over additional types of silanes.

The procedure of Example 1 was repeated except that D5 solvent, decamethylcyclo-pentasiloxane (Sigma-Aldrich, St.

Louis, Mo.), was used in place of octamethylcyclotetrasiloxane. Example 6a contained solvent but no silane. Example 6b used 1 wt % VX-225 and example 6c used 10 wt % VX-225 in solvent. The results are shown in FIG. 7. It is noted that the silane oligomer functionalized with amino groups and alkoxy groups (GE Silicones VX-225) in D5 solvent resulted in a magnetic signal strength over 80%.

Comparative Examples 6a and 6b

The same check stock as was used in Examples 6a-6c was not treated with fuser oil in one case and not treated with the silane (Comparative Example 6a, shown as C6a). In another case the check was printed and fused and no adhesion promoter was applied (Comparative Example 6b, shown as C6b). The same MICR encoding process was used as in Examples 6a-6c. The results are shown on FIG. 7. The un-oiled check had a magnetic signal strength of about 98%. The oiled check had a magnetic signal strength of about 60%.

Examples 6d-6f

The procedure of Example 1 was repeated in Example 6d. This procedure was then repeated in Examples 6e and 6f with the exception that silane A0700 (GE Advanced Materials, Wilton, Conn.) was used in Examples 6e and 6f in place of VX-225. Silane A0700 is N-(2-aminoethyl-3-aminopropyltrimethoxysilane, In Example 6e, 1 wt % A0700 was used. In Example 6f, 10 wt % A0700 was used. The results are shown in FIG. 7. It is noted that Example 6e, using 1 wt % A0700, had an average signal strength around 80%.

Example 7

The procedures of Examples 1 and 3 using XEROX 4024 check stock and 12-up personal check stock were repeated with the exception that the silane had Formulation 3 shown below:

Formulation 3: 10 wt. % aminosilane oligomer, $(CH_3O)_3Si$—$(CH_2)_3$—NH—$(CH_2)_3$—$Si(OCH_3)_3$) (Gelest SIB1833.0, Gelest, Inc.), and 90 wt % octamethylcyclotetrasiloxane (Sigma-Aldrich)

The results are shown below in Table 1. The magnetic signal strength was about 98% for the Xerox 4024 check stock and about 85% for 12-up personal check stock. There were no unrecognized characters.

Comparative Example 7

XEROX 4024 check stock and 12-up personal check stock were treated with octamethylcyclotetrasiloxane (Sigma-Aldrich) solvent without including any aminosilane oligomer. The results are shown below in Table 1. The magnetic signal strength was about 80% for the Xerox 4024 check stock and about 72% for 12-up personal check stock.

Example 8

The procedures of Examples 2 and 4 were repeated with the exception that the silane had formulation 4 shown below:

Formulation 4: 10 wt. % silane oligomer functionalized with amino groups and 6 ethoxy groups —$(C_2H_5O)_3Si$—$(CH_2)_3$—NH—$(CH_2)_3$—$Si(OC_2H_5)_3$ (Gelest SIB1824.6), and 90 wt % octamethylcyclotetrasiloxane (Sigma-Aldrich)

The results are shown in Table 1. The magnetic signal strength was about 92% for the Xerox 4024 check stock and about 77% for 12-up personal check stock. There were no unrecognized characters.

TABLE 1

Magnetic signal strengths Summary from Silane Couplers

| Example Number | Solvent | % Magnetic Signal Strength (Xerox 4024/ 12-up personal) | Unrecognized Characters (GTX) |
|---|---|---|---|
| Comp. 7 | octamethylcyclotetrasiloxane | 80%/72% | 0.6/0.0 |
| 1, 3 | 1 wt. % VX-225 in octamethylcyclotetrasiloxane | 90%/83% | 0.0/0.0 |
| 7 | 10 wt. % SIB1833.0 in octamethylcyclotetrasiloxane | 98%/85% | 0.0/0.0 |
| 8 | 10 wt. % SIB1824.6 in octamethylcyclotetrasiloxane | 92%/77% | 0.0/0.0 |

Examples 9a-9f

Examples were made to determine whether further hydrolysis/oligomerization of a dual functional siloxane, A-2120 (GE Silicones), which is N-(2-aminoethyl)-3-aminopropyl-methyldimethoxysilane, $NH_2CH_2CH_2NHCH_2CH_2CH_2Si(CH_3)(OCH_3)_2$, and/or a tetra functional siloxane, V-225 (GE Silicones), would lead to even higher magnetic signal strengths. Three different buffer solutions described below were separately mixed with each of the two siloxanes.

Buffer Solution 1:
Potassium phosphate dibasic ($K_2HPO_4$) powder (10 grams) was dissolved in 90 g of distilled water at room temperature.

Buffer Solution 2:
Sodium hydrogen sulfite ($NaHSO_3$) powder (10 grams) was dissolved in 90 g of distilled water at room temperature.

Buffer Solution 3:
Potassium phosphate monobasic ($KH_2PO_4$) powder (10 grams) was dissolved in 90 g of distilled water at room temperature.

None of these combinations raised magnetic signal strength above that achieved with 1 wt % of the respective silane in octamethylcyclotetrasiloxane solvent.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims. Unless specifically defined in a specific claim itself, steps or components of the invention should not be implied or imported from any above example as limitations to any particular order, number, position, size, shape, angle, color, or material.

What is claimed is:
1. A document comprising:
a substrate having a surface containing cellulose hydroxyl groups, the surface having fuser oil containing amino functional group release agents deposited on at least a portion of the substrate surface, an adhesion promote present on at least a first portion of the substrate surface containing fuser oil, the adhesion promoter comprising a silane component including at least one amino functional group and at least one of a second type of functional group, the second type of functional group being configured to bond with cellulose hydroxyl groups in the substrate, and a magnetic ink image formed over the first portion of the substrate surface, the magnetic ink image having a magnetic signal strength of at least 80%.

2. The document of claim 1, wherein the second type of functional group comprises at least one hydrolytic silane group —$Si(R)_{3-m}X_m$, wherein R is a hydrocarbyl group having from 1 to 6 carbon atoms, X is a hydroxyl group or a hydrolytic group, and m is an integer from 1 to 3.

3. The document of claim 2, wherein X comprises at least one member selected from the group consisting of a halide, a carboxyl group, an alkoxyl group, an arylalkyloxyl group, and an aryloxyl group.

4. The document of claim 1, wherein the silane component has 2 to 6 functional groups of the second type.

5. The document of claim 1, wherein the silane component has 1 to 2 amino functional groups.

6. The document of claim 2, wherein X is an alkoxyl group having 1 to about 6 carbon atoms.

7. The document of claim 6, wherein the alkoxyl group is a methoxyl or ethoxyl group.

8. The document of claim 1, wherein the silane component comprises wherein A1 and A2 are the same or different and represent —R1-B, R1 represents an alkyl group having from 1 to 6 carbons, B represents —NH2 or —NHR2NH2 wherein R2 represents an alkyl group having from 1 to 6 carbons, $R_3$, $R_4$, $R_5$ and $R_6$ are the same or different and represent groups having from 1 to 6 carbons, $R_7$ and $R_8$ are the same or different and represent alkyl groups having from 1 to 6 carbons, and n is 1 to 100.

9. The document of claim 1, wherein the adhesion promoter is deposited on the substrate in liquid form in a small chain silicone solvent.

10. The document of claim 9, wherein the small chain silicone solvent comprises at least one member selected from the group consisting of linear siloxanes having 2 to 10 silicon atoms and cyclic siloxanes having 3 to 6 silicon atoms.

11. The document of claim 9, wherein the small chain silicone solvent comprises at least one member selected from the group consisting of octamethylcyclotetrasiloxane and hexamethyldisiloxane.

12. The document of claim 11, wherein the magnetic ink image has a magnetic signal strength of at least 85%.

13. The document of claim 11, wherein the magnetic ink image has a magnetic signal strength of at least 90%.

14. The document of claim 8, wherein the adhesion promoter is deposited on the substrate in liquid form in a small chain silicone solvent.

15. The document of claim 14, wherein the small chain silicone solvent comprises at least one member selected from the group consisting of linear siloxanes having 2 to 10 silicon atoms and cyclic siloxanes having 3 to 6 silicon atoms.

16. The document of claim 14, wherein the small chain silicone solvent comprises at least one member selected from the group consisting of octamethylcyclotetrasiloxane and hexamethyldisiloxane.

17. The document of claim 1, wherein the substrate comprises paper stock.

18. The document of claim 1, wherein the magnetic ink image comprises a particulate magnetic material, a binder and a colorant.

19. The document of claim 12, the substrate comprises paper stock and the magnetic ink image comprises a particulate magnetic material, a binder and a colorant.

20. A document comprising:

a paper substrate having a surface containing cellulose hydroxyl groups, the surface having fuser oil containing amino functional group release agents deposited on at least a portion of the substrate surface, an adhesion promote present on at least a first portion of the substrate surface containing fuser oil, the adhesion promoter comprising a silane component including at least one amino functional group and at least one of a second type of functional group, the second type of functional group being configured to bond with cellulose hydroxyl groups in the substrate, and a magnetic ink image formed over the first portion of the substrate surface comprising a magnetic particulate material, the magnetic ink image having a magnetic signal strength of at least 85%.

* * * * *

UNITED STATES PATENT AND TRADEMARK OFFICE
CERTIFICATE OF CORRECTION

| | |
|---|---|
| PATENT NO. | : 8,557,368 B2 |
| APPLICATION NO. | : 11/982473 |
| DATED | : October 15, 2013 |
| INVENTOR(S) | : Kurt I. Halfyard et al. |

Page 1 of 1

It is certified that error appears in the above-identified patent and that said Letters Patent is hereby corrected as shown below:

On the title page item (75), delete "Xan-Xing Hu" and insert --Nan-Xing Hu--.

Signed and Sealed this
Twenty-eighth Day of January, 2014

Michelle K. Lee
*Deputy Director of the United States Patent and Trademark Office*